United States Patent
Esveldt

(10) Patent No.: US 9,915,372 B2
(45) Date of Patent: Mar. 13, 2018

(54) HIGH INTEGRITY PRESSURE PROTECTING SYSTEM (HIPPS) FOR A FLUID LINE

(71) Applicant: MOKVELD Valves B. V., AJ Gouda (NL)

(72) Inventor: Vincent Esveldt, Sleeuwijk (NL)

(73) Assignee: MOKVELD Valves B.V., AJ Gouda (NL)

( * ) Notice: Subject to any disclaimer, the term of this patent is extended or adjusted under 35 U.S.C. 154(b) by 0 days.

(21) Appl. No.: 15/356,968

(22) Filed: Nov. 21, 2016

(65) Prior Publication Data

US 2017/0114914 A1 Apr. 27, 2017

Related U.S. Application Data

(63) Continuation of application No. PCT/EP2015/062127, filed on Jun. 1, 2015.

(30) Foreign Application Priority Data

Jun. 25, 2014 (EP) .................................... 14173894

(51) Int. Cl.
 *F16K 1/12* (2006.01)
 *F16K 31/122* (2006.01)
 *F16K 17/00* (2006.01)

(52) U.S. Cl.
 CPC .......... *F16K 31/1223* (2013.01); *F16K 1/126* (2013.01); *F16K 17/00* (2013.01)

(58) Field of Classification Search
 CPC ...... F16K 31/1223; F16K 17/00; F16K 1/126; Y10T 137/3367; Y10T 137/3421; Y10T 137/3476; Y10T 137/353; Y10T 137/7761; Y10T 137/7762
 USPC ............ 137/219, 220, 221, 222, 487.5, 488; 251/175
 See application file for complete search history.

(56) References Cited

U.S. PATENT DOCUMENTS 2,725,891 A 12/1955 De Bourguignon et al.
2,919,714 A * 1/1960 Mrazek ................... F16K 1/126
 137/220

(Continued)

FOREIGN PATENT DOCUMENTS

BE 819011 A1 12/1974
DE 2517730 A1 11/1975

*Primary Examiner* — Eric Keasel
(74) *Attorney, Agent, or Firm* — Von Rohrscheidt Patents

(57) ABSTRACT

High Integrity Pressure Protecting Systems (HIPPS), wherein the HIPPS has an ON/OFF valve with a housing, wherein the housing has an inlet and an outlet, and a conduit for passage of a fluid from the inlet to the outlet, and with a closure element, wherein in an open position the closure element opens the conduit for allowing the passage, and in a closing position the closure element closes the conduit for inhibiting the passage, and a hydraulic actuator, having a control element that is fixated at the closure element, and a switchable hydraulic supply unit, which in an active state supplies a control face of the control element with a control pressure, and in a passive state releases the control pressure from the control face, a sensor measuring a pressure of the fluid downstream from the outlet, and a logic solver that compares the downstream pressure to a critical value.

9 Claims, 7 Drawing Sheets

(56) References Cited

U.S. PATENT DOCUMENTS

| | | | | |
|---|---|---|---|---|
| 3,734,121 | A | * | 5/1973 | Rowe .................. G05D 16/106 137/220 |
| 8,910,653 | B2 | * | 12/2014 | McAuliffe .............. F16K 31/12 137/220 |
| 8,931,504 | B2 | * | 1/2015 | Canjuga .................. F16K 1/126 137/220 |
| 2006/0202428 | A1 | | 9/2006 | Verwoerd |
| 2007/0095401 | A1 | | 5/2007 | Webster |

* cited by examiner

2

HIGH INTEGRITY PRESSURE PROTECTING SYSTEM (HIPPS) FOR A FLUID LINE

RELATED APPLICATIONS

This application is a continuation of International Patent Application PCT/EP2015/062127 filed on Jun. 1, 2015, claiming priority from European Patent Application 14173894.8 filed on Jun. 25, 2014, both of which are incorporated in their entirety by this reference.

FIELD OF THE INVENTION

The invention relates in general to High Integrity Pressure Protecting Systems (HIPPS). For safety reasons, HIPPS systems always require manual action for opening.

BACKGROUND OF THE INVENTION

High Integrity Pressure Protection Systems (HIPPS) are commonly known Safety Instrumented Systems (SIS) for preventing unsafe conditions caused by a downstream pressure rising in a pipeline. HIPPS valves require a high level of reliability and shall be designed to close the pipeline in any condition when required. When a critical downstream pressure is sensed, the final element (valve) is closed to prevent further pressurization of the downstream pipeline. The known HIPPS valve have an external actuator, these actuators often use springs/hydraulics and are very large to ensure sufficient safety to be able to close the valve at any condition. These external actuators could fail resulting in a loss of actuation force.

In related art, DE 25 17 730 A1 suggests an ON/OFF-valve to be closed by upstream pressure. However, this known valve is not usable for including into an HIPPS without substantial modifications, in particular to the valve seat and to the sealing element, as enhancement for the typically high pressure levels in a pipeline.

BRIEF SUMMARY OF THE INVENTION

Thus, it is an it is an object of the invention to provide a valve in which the actuation force is inherently present when the valve has to close.

The object is achieved by a High Integrity Pressure Protecting System (HIPPS) for a fluid line, the HIPPS including an ON/OFF-valve including a housing including an inlet, an outlet, a conduit for a passage of a fluid from the inlet to the outlet, a closure element that is axially movable in a direction from the inlet to the outlet from an open position to a closed position, wherein the closure element opens the conduit allowing the passage in the open position and the closure element closes the conduit preventing the passage in the closed position; a hydraulic actuator including a control element that is fixated at the closure element, a switchable hydraulic supply unit, which supplies a control face of the control element with a control pressure in an active state, and releases the control pressure from the control face in a passive state, a sensor measuring a downstream pressure of the fluid downstream from the outlet, a logic solver that compares the downstream pressure to a critical value and switches the hydraulic supply unit to the active state allowing the closure element to move into or stay in the open position when the downstream pressure is below the critical value, and that switches the hydraulic supply unit to the passive state allowing the closure element to stay in the closing position, when the downstream pressure exceeds the critical value, and wherein an opposite face of the control element which opposite face is arranged opposite to the control face is exposed to the downstream pressure of the fluid so that the downstream pressure of the fluid pushes the closure element into the closed position.

The object is also achieved by a Method for operating an High Integrity Pressure Protecting System (HIPPS) in a fluid line, the HIPPS including an ON/OFF-valve including a housing including an inlet, an outlet, a conduit for a passage of a fluid from the inlet to the outlet, a closure element that is axially movable in a direction from the inlet to the outlet from an open position to a closed position, wherein the closure element opens the conduit allowing the passage in the open position and the closure element closes the conduit preventing the passage in the closed position; a hydraulic actuator including a control element that is fixated at the closure element, the method comprising the steps supplying a control face of the control element with a control pressure, in an active state, and releasing the control pressure from the control face in a passive state; measuring a downstream pressure of the fluid, downstream of the outlet; comparing the downstream pressure to a critical value; switching the hydraulic actuator to the active state to hold the closure element in the open position, when the downstream pressure is below the critical value; switching the hydraulic actuator to the passive state to move the closure element into the closed position, or to hold the closure element in the closed position, when the downstream pressure exceeds the critical value; exposing an opposite face of the control element, which opposite face is arranged opposite to the control face, to the downstream pressure, so that the downstream pressure of the fluid pushes the closure element into the closed position.

The invention proposes that an opposite face of the control element, opposite to the control face is exposed to the downstream pressure of the fluid, so that the downstream pressure of the fluid pushes the closure element into the closing position. In an HIPPS according to the invention, the rising downstream pressure of the fluid itself is the acting means that closes the ON/OFF-valve.

In an advantageous HIPPS according to the invention, the actuator is arranged inside the housing. In such HIPPS, the actuator is protected from pressure and other impact from the environment, in particular in sub-sea, and in seabed applications. Alternatively, e.g. in globe valves, the actuator may be arranged outside of the housing.

In such HIPPS, the conduit preferably surrounds the actuator.

With the conduit surrounding the actuator, inside an inner housing, the ON/OFF-valve is substantially pressure balanced. Alternatively the conduit may be formed alongside the actuator to avoid wear of the inner housing.

In another advantageous HIPPS according to the invention, the control element is a piston of the hydraulic actuator. Such HIPPS is advantageous in particular for large diameters.

In an alternatively advantageous HIPPS according to the invention, the control element is a cylinder barrel of the hydraulic actuator. Such HIPPS is advantageous in particular for smaller diameters.

In another advantageous HIPPS according to the invention, a spring pushes the closure element into the closing position. Such additional springs are suggested by common standards for HIPPS, to assist closing of the valve.

In another advantageous HIPPS according to the invention, at least one sensor identifies a position of the closure element. Including a sensor into the ON/OFF-valve provides for monitoring the status of the HIPPS.

In a another advantageous HIPPS according to the invention, the closure element has an orifice, giving way to the fluid from the outlet through the closure element to the back face of the control element. An orifice formed in the closure element provides the simplest connection from the outlet of the valve to the inside of the inner housing.

The invention further proposes a method for operating such HIPPS in a fluid line, wherein an opposite face of the control element, opposite to the control face, is exposed to the pressure, so that the downstream pressure of the fluid pushes the closure element into the closing position. The method according to the invention may be executed using the HIPPS described supra, and features the same advantages.

BRIEF DESCRIPTION OF THE DRAWINGS

The apparatus according to the invention and the associated method are subsequently described in more detail with reference to advantageous embodiments illustrated in the drawing figures, wherein FIG. 1 schematically illustrates a first HIPPS according to the invention.

DETAILED DESCRIPTION OF THE INVENTION

Figure 1:
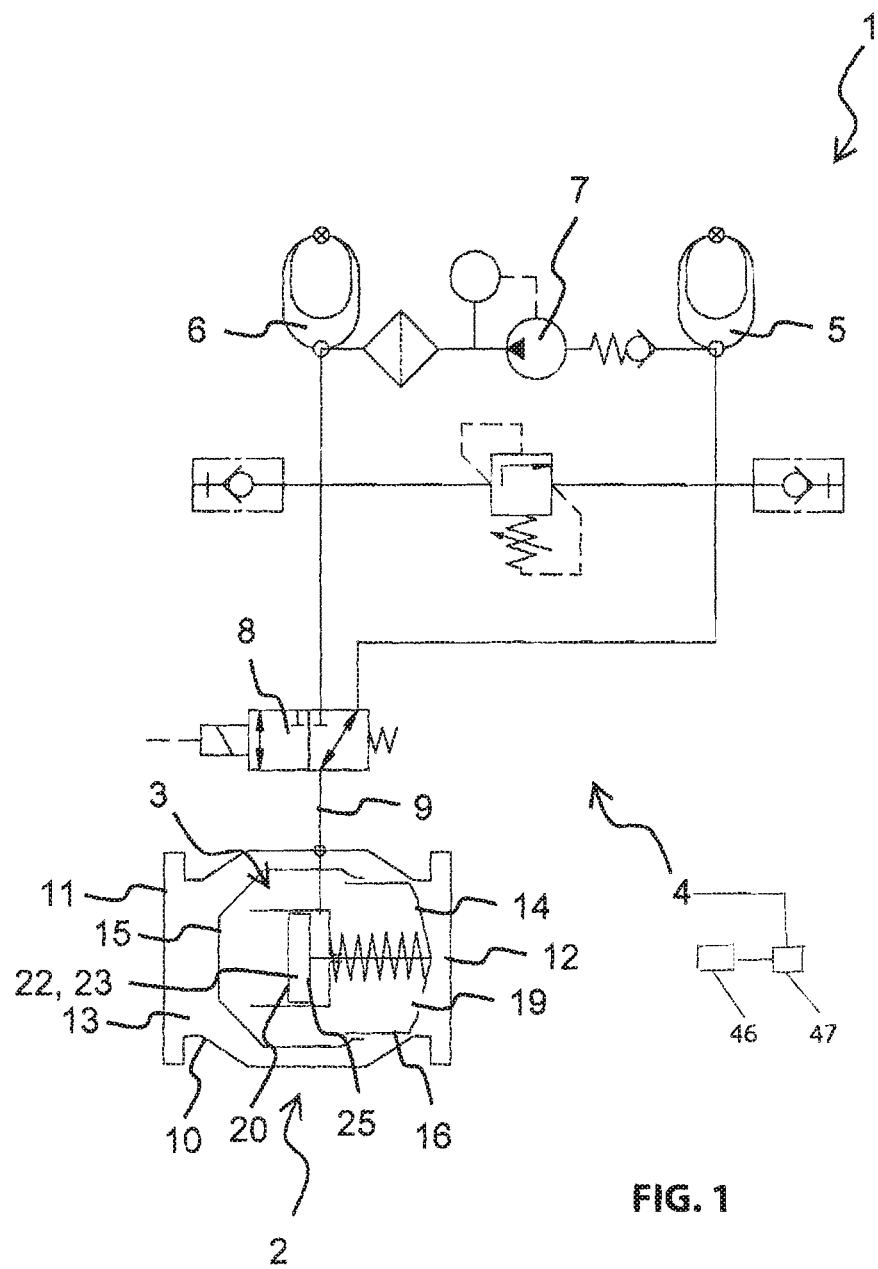

A first HIPPS 1 according to the invention is illustrated in FIG. 1:

The first HIPPS 1 has an ON/OFF-valve 2 for application into a fluid line, a hydraulic actuator 3 integrated into the ON/OFF-valve 2, and a hydraulic supply unit 4. Further commonly known elements of the first HIPPS 1, namely a sensor 46 measuring a downstream pressure of a fluid flowing through the ON/OFF-valve 2, and a logic solver 47 for interpreting data from the sensor.

The hydraulic supply unit 4 has a low pressure reservoir 5 and a high pressure reservoir 6 for a hydraulic fluid, a pump 7 for the hydraulic fluid between the low pressure reservoir 5 and the high pressure reservoir 6, and a 3/2-valve 8 connecting either the low pressure reservoir 5 or the high pressure reservoir 6 to the hydraulic actuator 3 through an hydraulic line 9. The 3/2-valve 8 is driven by the logic solver.

Figure 2:
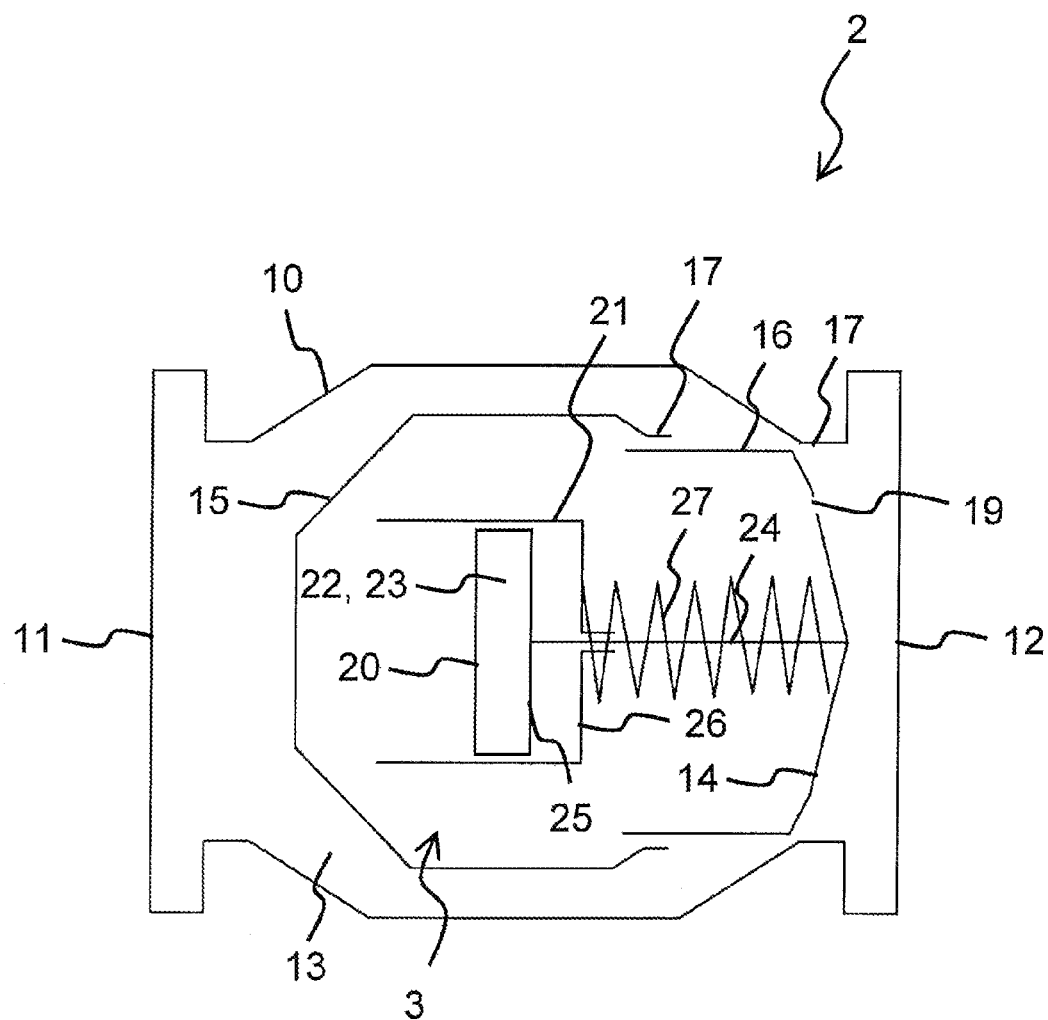
FIG. 2 schematically illustrates the ON/OFF-valve of this HIPPS.

The ON/OFF-valve 2, in detail shown in FIG. 2, has a housing 10, the housing 10 having an inlet 11 and an outlet 12, and a conduit 13 for passage of the fluid from the inlet 11 to the outlet 12.

The ON/OFF-valve 2 has a cup-shaped closure element 14 that is axially movable in a direction from the inlet 11 to the outlet 12 from an open position to a closing position. The closure element 14 forms part of an inner housing 15 inside the housing 10 that encloses the hydraulic actuator 3, and is surrounded by the conduit 13.

A cylindrical side wall 16 of the closure element 14 is dynamically sealed to seats 17 both in the inner housing 15, and in the housing 10. A base 18 of the closure element 14 has an orifice 19 that gives way to the fluid from the outlet 12 through the closure element 14 to a back face 20 of the control element.

A cylinder barrel 21 of the hydraulic actuator 3 is fixed to the inner housing 15, while a movable piston 22—forming a control element 23—inside the cylinder barrel 21 is connected to the closure element 14 by a connecting rod 24. The control element 23 has a control face 25 that faces a cylinder cap 26 of the hydraulic actuator 3.

The ON/OFF-valve 2 further has a spring 27 supported between the cylinder cap 26 of the hydraulic actuator 3, and the closure element 14.

Figure 3A:
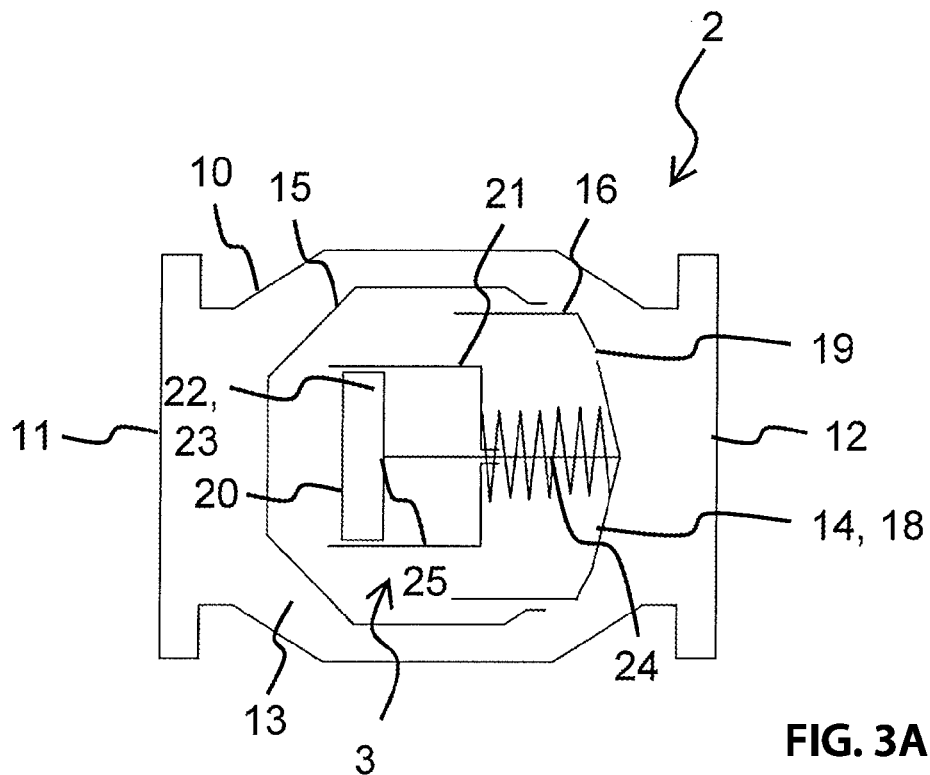
FIG. 3a/b schematically illustrates this ON/OFF-valve in open and closed positions.

In active state of the hydraulic supply unit 4, the inside of the hydraulic actuator 3 is supplied with a control pressure, that generates a control force upon the control face 25, pulling the closure element 14 to the open position, as shown in FIG. 3a: The conduit 13 is open from the inlet 11 to the outlet 12, permitting passage of the fluid through the fluid line.

Inside the inner housing 15, the downstream pressure of the fluid, downstream of the outlet 12, generates a closing force to the back face 20 of the control element 23. More precisely, the closing force is proportional to the excess area of visible faces of the movable parts—i.e. the control element 23 and the closing element—viewed from the inlet 11 over the visible faces of the same, viewed from the outlet 12.

Figure 3B:
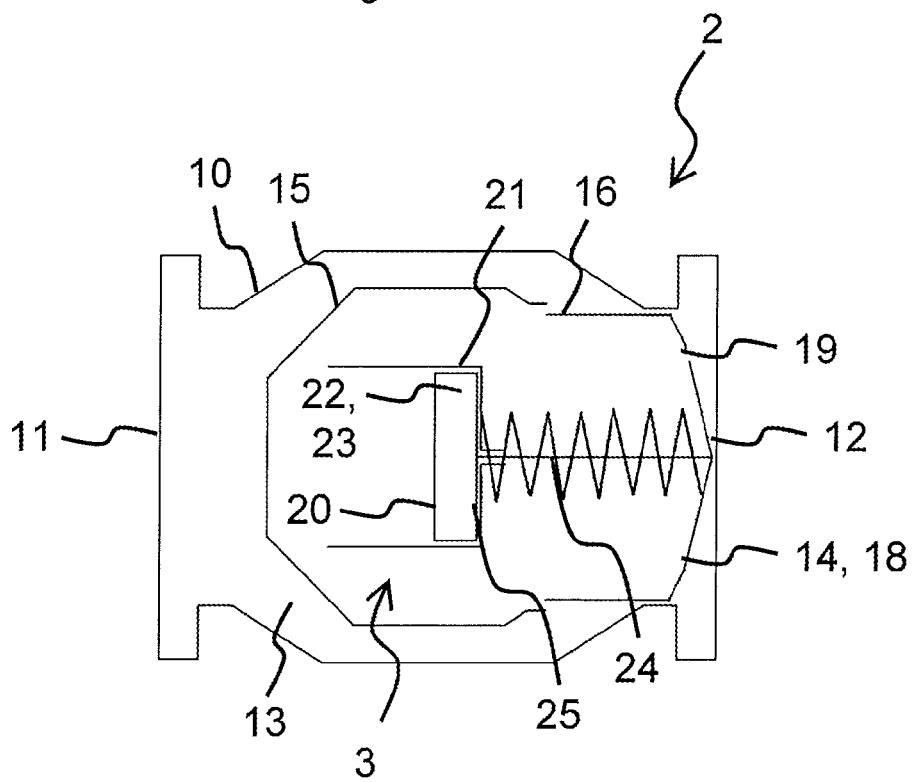

Whenever this closing force, added to the spring force, exceeds the control force, it pushes the closure to the closing position, as shown in FIG. 3b: The control element 23 closes the conduit 13, and inhibits passage of the fluid through the fluid line.

The closure element 14 is thus pushed to the closing position, when in passive state of the hydraulic supply unit 4, the control pressure is released from the control face 25. Furthermore, the closure element 14 is also pushed to the closing Position with the control face 25 under control pressure, when the downstream pressure exceeds an emergency closing level defined by the control pressure of the hydraulic supply unit 4, and by the spring force.

Figure 4A:
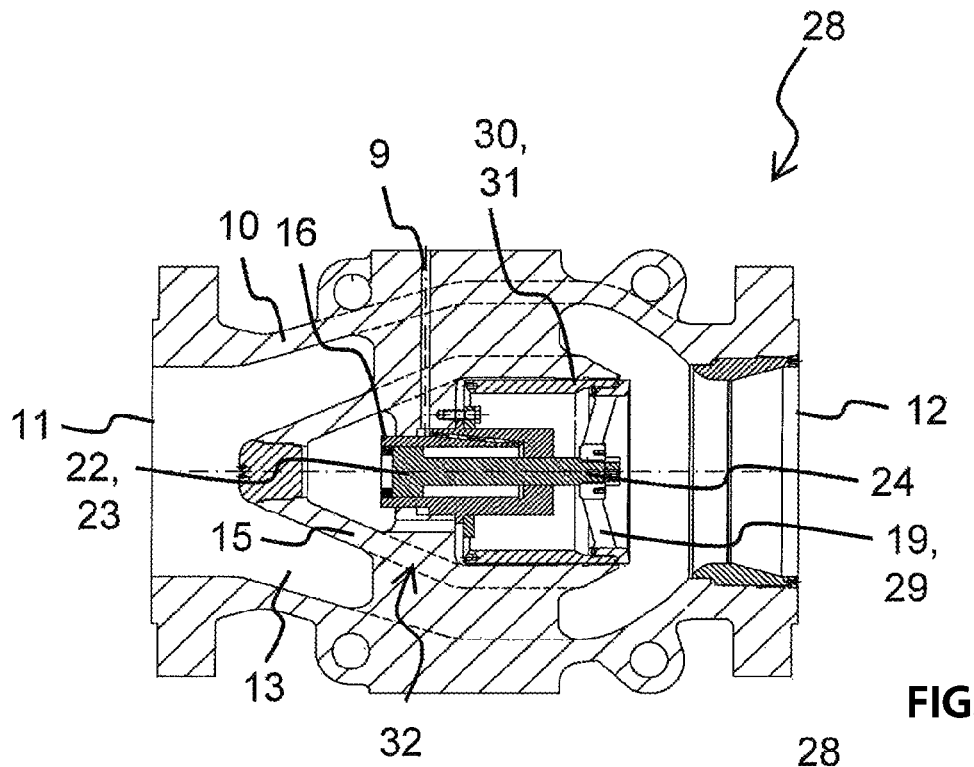
FIG. 4a/b illustrates an ON/OFF-valve of a second HIPPS according to the invention in these positions.
Figure 4B:
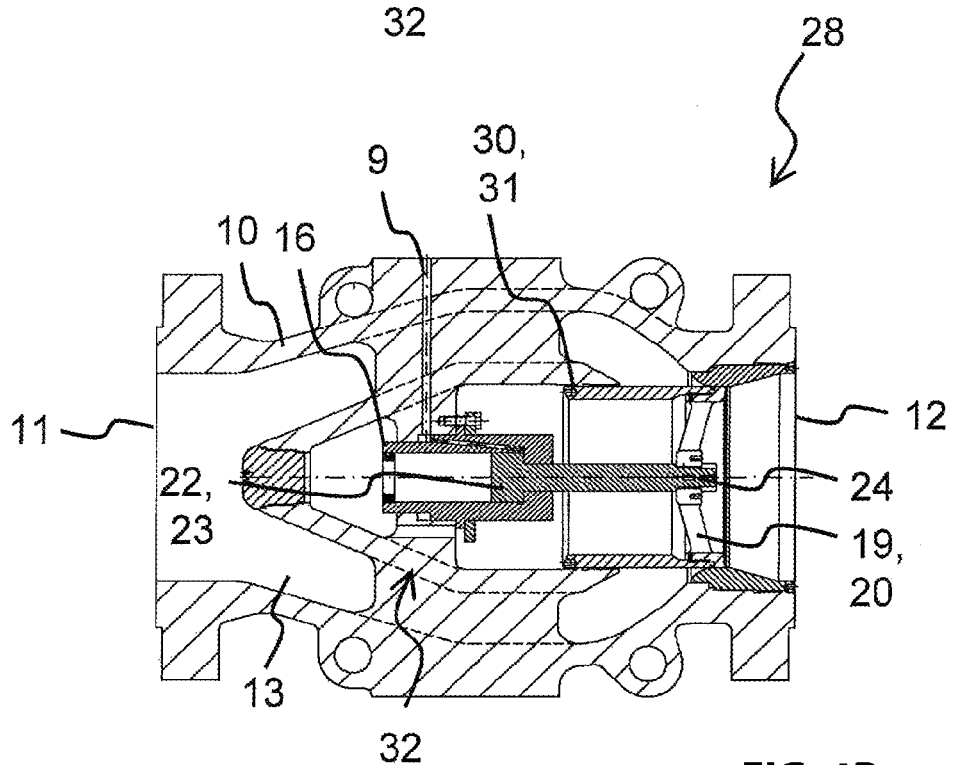

FIGS. 4a and 4b show a second ON/OFF-valve 28 of another HIPPS according to the invention. The second ON/OFF-valve 28 basically has all features of the first ON/OFF-valve 2 described supra, and has a flange size of 48 inch.

The base 29 of the closure element 30 forms a spoked wheel and is screwed to the cylindrical side wall 31. FIG. 4a shows the second ON/OFF-valve 28 in the open position, FIG. 4b in the closing position.

Figure 5:
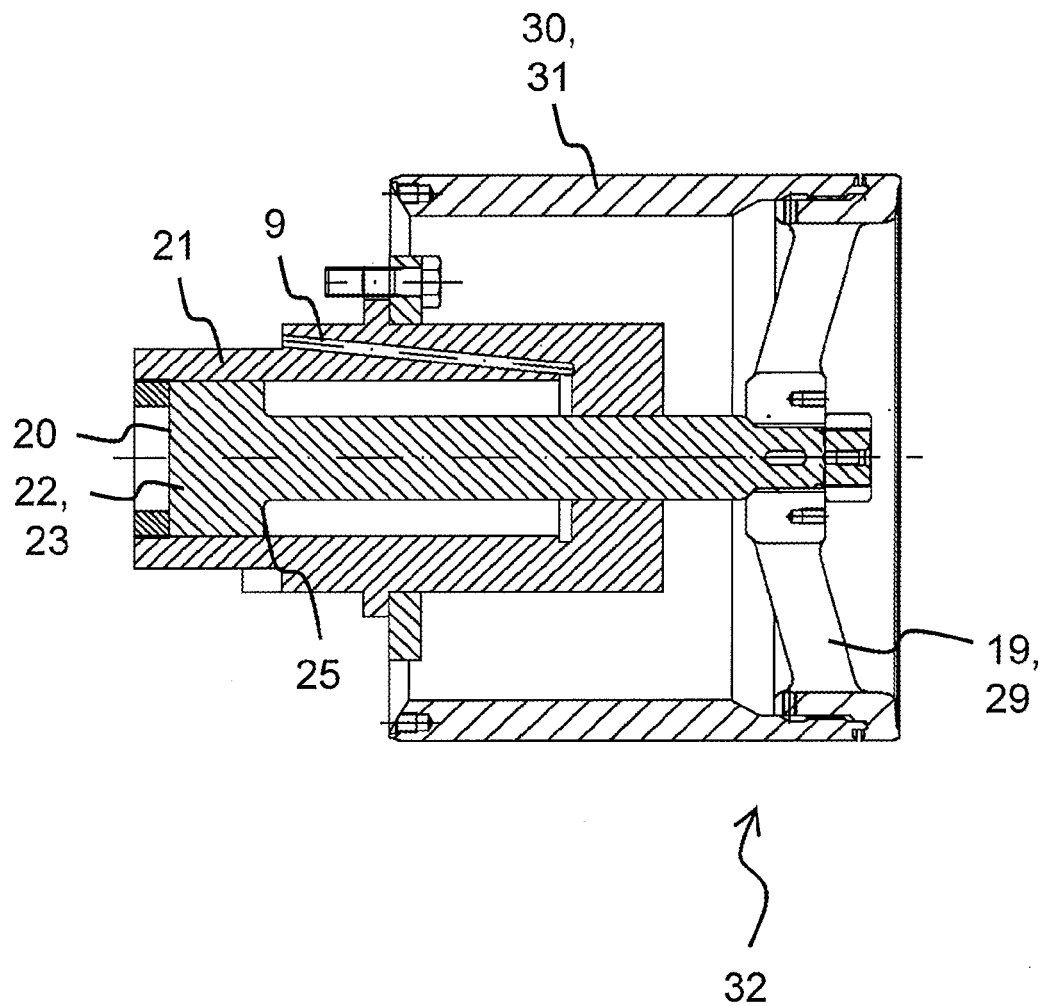
FIG. 5 illustrates an engineering detail of this ON/OFF-valve.

FIG. 5 in detail shows the hydraulic actuator 32 and the closure element 30 of the second ON/OFF-valve 28.

Figure 6A:
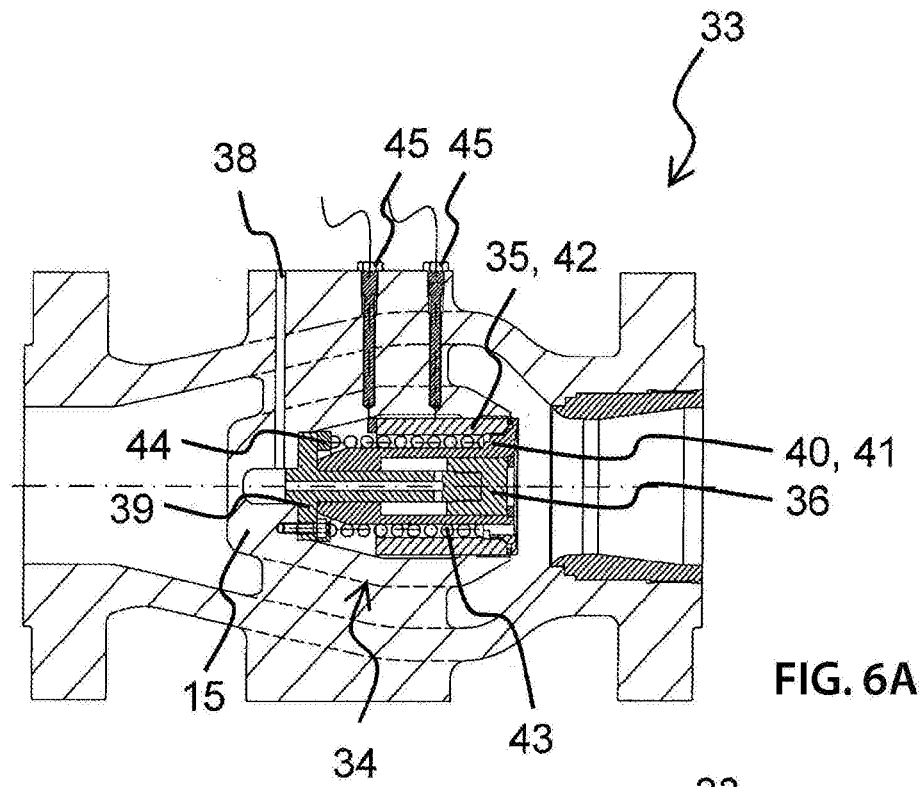
FIG. 6a/b illustrates an ON/OFF-valve of a third HIPPS according to the invention in these positions.
Figure 6B:
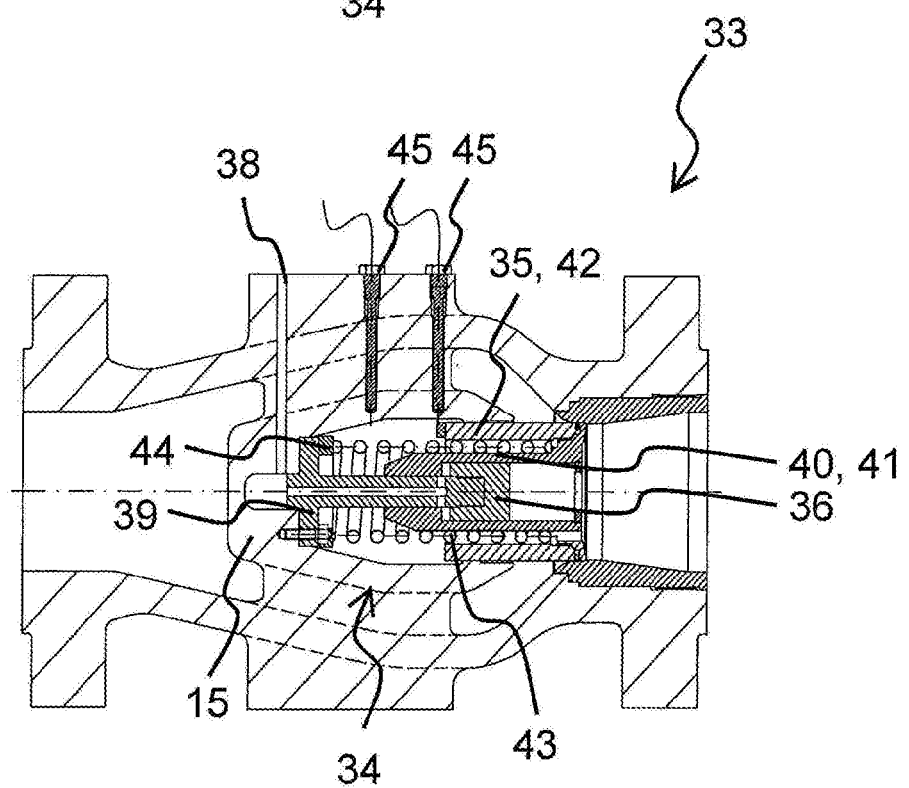
Figure 7:
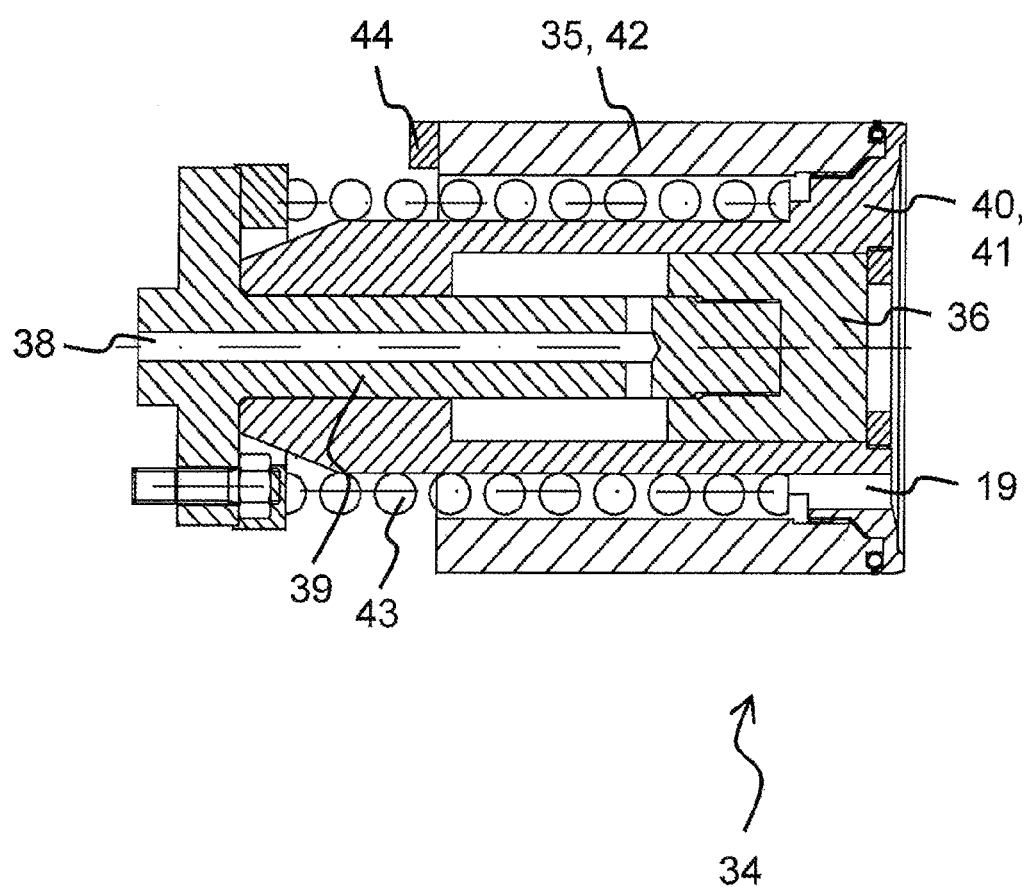
FIG. 7 illustrates an engineering detail of this ON/OFF-valve.

FIGS. 6a and 6b show a third ON/OFF-valve 33 of yet another HIPPS according to the invention. The third ON/OFF-valve 33 in principle resembles the second ON/OFF-valve 28, but has a flange size of 6 inch, only. Other HIPPS's according to the invention may of course have ON/OFF-valves with any flange size between these two extreme values. FIG. 6a shows the third ON/OFF-valve 33 in the open position, FIG. 6b in the closing position. FIG. 7 in detail shows the hydraulic actuator 34 and the closure element 35 of the third ON/OFF-valve 33:

In the third ON/OFF-valve 33, a piston 36 of the hydraulic actuator 34 is fixed to the inner housing 37, and the hydraulic line 38 thus integrated into the piston rod 39. A cylinder barrel 40—forming a control element 41—is movable, and screwed to the cylindrical side wall 42 of the closure element 35. The spring 43 is supported between the piston rod 39, and the closure element 35.

The third ON/OFF-valve 33 further includes a permanent magnet 44 attached to the closure element 35, and two sensing heads 45 for detecting the position of permanent magnet 44, and thus the closure element 35.

The drawings are simplified and in particular seals are not shown.

REFERENCE NUMERALS AND DESIGNATIONS

1 HIPPS
2 ON/OFF-valve
3 hydraulic actuator
4 hydraulic supply unit
5 low pressure reservoir
6 high pressure reservoir
7 pump
8 3/2-valve
9 hydraulic line
10 housing
11 inlet
12 outlet
13 conduit
14 closure element
15 inner housing
16 side wall
17 seat
18 base
19 orifice
20 back face
21 cylinder barrel
22 piston
23 control element
24 connecting rod
25 control face
26 cylinder cap
27 spring
28 ON/OFF-valve
29 base
30 closure element
31 side wall
32 hydraulic actuator
33 ON/OFF-valve
34 hydraulic actuator
35 closure element
36 piston
37 inner housing
38 hydraulic line
39 piston rod
40 cylinder barrel
41 control element
42 side wall
43 spring
44 permanent magnet
45 sensing head
46 sensor
47 logic solver

What is claimed is:

1. A High Integrity Pressure Protecting System (HIPPS) for a fluid line, the HIPPS comprising:
   an ON/OFF-valve including
   a housing including
   an inlet,
   an outlet,
   a conduit for a passage of a fluid from the inlet to the outlet,
   a closure element that is axially movable in a direction from the inlet to the outlet from an open position to a closed position,
   wherein the closure element opens the conduit allowing the passage in the open position and the closure element closes the conduit preventing the passage in the closed position;
   a hydraulic actuator including
   a control element that is fixated at the closure element,
   a switchable hydraulic supply unit, which supplies a control face of the control element with a control pressure in an active state, and releases the control pressure from the control face in a passive state,
   a sensor measuring a downstream pressure of the fluid downstream from the outlet,
   a logic solver
   that compares the downstream pressure to a critical value and switches the hydraulic supply unit to the active state allowing the closure element to move into or stay in the open position when the downstream pressure is below the critical value, and
   that switches the hydraulic supply unit to the passive state allowing the closure element to stay in the closed position, when the downstream pressure exceeds the critical value, and
   wherein an opposite face of the control element which opposite face is arranged opposite to the control face is exposed to the downstream pressure of the fluid so that the downstream pressure of the fluid pushes the closure element into the closed position.

2. The HIPPS according to claim 1, wherein the actuator is arranged inside the housing.

3. The HIPPS according to claim 2, wherein the conduit envelops the actuator.

4. The HIPPS (1) according to claim 1, wherein the control element is a piston of the hydraulic actuator.

5. The HIPPS according to claim 1, wherein the control element is a cylinder barrel of the hydraulic actuator.

6. The HIPPS according to claim 1, further comprising a spring that pushes the closure element into the closed position.

7. The HIPPS according to claim 1, further comprising at least one sensor for identifying a position of the closure element.

8. HIPPS (1) according to claim 1, wherein
   the closure element includes an orifice allowing the fluid to flow from the outlet through the closure element to a back face of the control element.

9. A Method for operating an High Integrity Pressure Protecting System (HIPPS) in a fluid line, the HIPPS including
   an ON/OFF-valve including
   a housing including
   an inlet,
   an outlet,
   a conduit for a passage of a fluid from the inlet to the outlet,
   a closure element that is axially movable in a direction from the inlet to the outlet from an open position to a closed position, wherein the closure element opens the conduit allowing the passage in the open position and the closure element closes the conduit preventing the passage in the closed position;

a hydraulic actuator including a control element that is fixated at the closure element, the method comprising the steps:

supplying a control face of the control element with a control pressure, in an active state and releasing the control pressure from the control face in a passive state;

measuring a downstream pressure of the fluid downstream of the outlet;

comparing the downstream pressure to a critical value;

switching the hydraulic actuator to the active state to hold the closure element in the open position when the downstream pressure is below the critical value;

switching the hydraulic actuator to the passive state to move the closure element into the closed position, or to hold the closure element in the closed position, when the downstream pressure exceeds the critical value;

exposing an opposite face of the control element, which opposite face is arranged opposite to the control face, to the downstream pressure, so that the downstream pressure of the fluid pushes the closure element into the closed position.

* * * * *